Patented Mar. 4, 1952

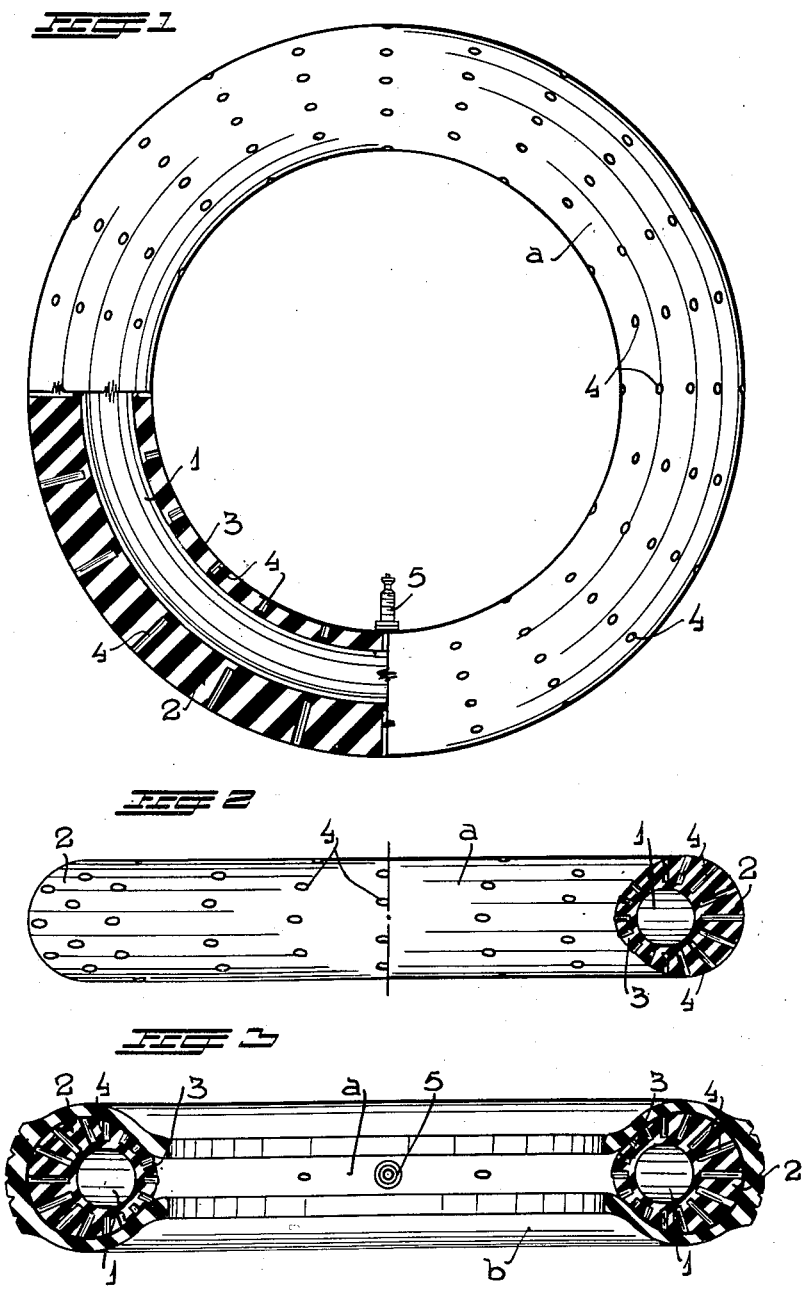

2,588,097

UNITED STATES PATENT OFFICE 2,588,097

INNER TUBE FOR TIRES

Adolfo Eiras, Buenos Aires, Argentina

Application March 15, 1948, Serial No. 14,942

1 Claim. (Cl. 152—349)

The present invention relates to an air or inner tube for tires and is characterized by the fact that the thickness of the walls of said tube is non-uniform, the same having a thick tread wall constituting a heel protecting the tube against punctures, since the tread wall is thick enough to prevent nails or other objects capable of causing punctures from completely piercing the tube and bringing about the consequent loss of pressure.

On the other hand, even when an object succeeds in wholly piercing the wall of the tube the very thickness of the wall will act as an agent tending to keep the tire fit to maintain the stability of the vehicle, giving the driver thereof time to stop in order to take such steps as are necessary to repair the damage either by substituting a fresh tube for the damaged one or by vulcanizing the latter. Thus the constructional arrangement of the tube, as based on the principle the present invention has for its object, embodies a most important factor, that is to say, it maintains the stability of the vehicle because the deflation of the tires can not take place immediately.

Another factor characterizing the tube of the present invention is the fact that the whole surface of the walls thereof is provided with numerous recesses constituting air cells capable of imparting a greater flexibility to the unit making up the tube and neutralizing, at the same time, the danger of the walls of the tube running hot too early, so that the latter is kept inflated to the predetermined degree without alteration of this condition by temperature changes that would increase the same, such temperature changes being brought about either by the speed developed by the vehicle or by weather conditions.

In order that the present invention may be readily understood and easily put into practice, the same is illustrated in the accompanying drawing wherein:

Figure 1 is a front view of the tube constructed in accordance with the present invention, partially in section;

Figure 2 is a profile and partially sectional view of the tube; and

Figure 3 is a profile and sectional view of the tube as applied to a tire.

In these figures the same reference numerals indicate the same or corresponding parts.

In the drawing, there is shown an air tube comprising a ring-shaped body $a$ of flexible material with a cavity $1$ extending all around it and which constitutes the air tube proper. The ring-shaped flexible body $a$ is divided into two zones, i. e. an outer tread wall zone 2 of greater thickness than the inner rim wall zone 3. The outer zone 2 provides the heel protecting the tube $1$ against the danger of punctures, and both the outer zone and the inner one are provided all over their surfaces with numerous cavities comprising cells 4 capable of imparting greater flexibility to the hollow body $a$ and, at the same time, forming air chambers or cells suitable for keeping the tube sufficiently cooled, thereby avoiding the risks involved by the heating of the walls of the tube while the vehicle is operated.

Tube $1$ will communicate with the outside through an ordinary air inflation and check valve 5 applied to the inner circumferential zone 3, the tube thus being ready to be applied to an ordinary tire $b$, as is shown in Figure 3, the said tube, i. e. the hollow body $a$ adapting itself to the inner walls of this tire on being inflated by the air inflated under pressure into the cavity $1$, as a result of the flexibility due to the presence of the cells 4.

The advantages of the air tube constructed in accordance with the present invention are clearly apparent from the foregoing description and the accompanying drawing. Modifications in the disclosed tube are intended to be included in the invention, provided they fall within the limits and scope of the appended claim.

What I claim is:

A one piece annular inner tube having a continuous smooth toroidal outer surface and made entirely of flexible, stretchable rubber, the said tube being formed with an annular opening of circular cross section extending therethrough and said tube having a tread wall, the thickness of which is substantially greater than that of the rim wall, and the thickness of the wall of said tube diminishing gradually from said tread wall to said rim wall, and said inner tube being formed with a plurality of individual, mutually and closely spaced, substantially cylindrical cavities extending inwardly from said continuous smooth toroidal outer surface almost up to said annular opening, the said cavities opening onto said continuous smooth toroidal outer surface of said tube and being located in all parts of the wall of said tube.

ADOLFO EIRAS.

REFERENCES CITED

The following references are of record in the file of this patent:

UNITED STATES PATENTS

| Number | Name | Date |
| --- | --- | --- |
| 1,384,244 | Disbrow | July 12, 1921 |
| 1,408,644 | Schuler | Mar. 7, 1922 |
| 1,464,709 | Herzog | Aug. 14, 1923 |

FOREIGN PATENTS

| Number | Country | Date |
| --- | --- | --- |
| 342,675 | Great Britain | 1931 |